United States Patent [19]
Berglund et al.

[11] Patent Number: 6,026,210
[45] Date of Patent: Feb. 15, 2000

[54] FIBER OPTIC CONNECTOR SPRING

[75] Inventors: Sidney J. Berglund; Donald G. Doss, both of Round Rock, Tex.; David Cowden, Marietta, Ga.

[73] Assignee: 3M Innovative Properties Company, St. Paul, Minn.

[21] Appl. No.: 08/801,058

[22] Filed: Feb. 14, 1997

[51] Int. Cl.[7] .................................................. G02B 6/38
[52] U.S. Cl. ............................. 385/137; 385/59; 385/56
[58] Field of Search .................................. 385/136, 135, 385/55, 56, 57, 58, 59, 60, 65, 70

[56] References Cited

U.S. PATENT DOCUMENTS

| | | | |
|---|---|---|---|
| 4,028,162 | 6/1977 | Cherin et al. ............................ | 156/158 |
| 4,045,121 | 8/1977 | Clark ....................................... | 350/96.21 |
| 4,077,702 | 3/1978 | Kunze et al. ........................... | 350/96.21 |
| 4,148,559 | 4/1979 | Gauthier ................................. | 350/96.21 |
| 4,218,113 | 8/1980 | Uberbacher et al. ................. | 350/96.21 |
| 4,322,127 | 3/1982 | Comerford et al. .................. | 350/96.21 |
| 4,506,946 | 3/1985 | Hodge ...................................... | 385/70 |
| 4,767,180 | 8/1988 | Zajac et al. ............................ | 350/96.21 |
| 4,779,952 | 10/1988 | Hayashi et al. ....................... | 350/96.21 |
| 5,080,461 | 1/1992 | Pimpinella ................................. | 385/65 |
| 5,151,964 | 9/1992 | Carpenter et al. ......................... | 385/98 |
| 5,230,032 | 7/1993 | Muzslay .................................... | 385/66 |
| 5,469,522 | 11/1995 | Fan ........................................... | 385/98 |

FOREIGN PATENT DOCUMENTS

| | | | |
|---|---|---|---|
| 640857 | 1/1995 | European Pat. Off. ........ | G02B 26/02 |
| 2 660 442 | 4/1991 | France ............................ | G02B 6/36 |
| 52-50735 | 4/1977 | Japan ....................................... | 385/98 |
| 55-96912 | 7/1980 | Japan ....................................... | 385/98 |
| 59050414 | 9/1982 | Japan .............................. | G02B 7/26 |

*Primary Examiner*—Hung N. Ngo
*Attorney, Agent, or Firm*—John A. Portkort

[57] ABSTRACT

An optical fiber connector optically connects a first optical fiber and a second optical fiber. The optical fiber connector includes a plug the retains and selectively aligns the first optical fiber, a receptacle that retains and selectively aligns the second optical fiber, and means for forcing the first optical fiber against the second optical fiber. The plug of the optical fiber connector is inserted into the receptacle in order to contact the first optical fiber to the second optical fiber. The force created at the point of contact of the fibers by the means for forcing is in excess of the bending stress of the optical fibers.

13 Claims, 6 Drawing Sheets

FIBER OPTIC CONNECTOR SPRING

CROSS-REFERENCE TO RELATED APPLICATIONS

This application is related to U.S. patent application Ser. No. 08/664,039, filed on Jun. 13, 1996, of Raman K. Selli, et al., titled "Optical Fiber Connector Using Fiber Spring Force and Alignment Groove". This related application is assigned to the assignee of the present invention and is hereby incorporated herein in its entirety by this reference thereto.

BACKGROUND OF THE INVENTION

The present invention relates to optical fiber connector devices and methods and, more particularly, relates to such devices and methods having springs to increase the contact force at the contact face in fiber to fiber joints to effect exceptional optical connections.

Conventional fiber optic connectors typically employ precision ferrules aligned with sleeves to provide alignment in fiber to fiber optical connections. Ends of optical fibers to be optically connected are each equipped with a ferrule. The ferrules are typically cylindrical, with an inner, longitudinal cylindrical void to accommodate a single optic fiber end with minimum tolerance. The optic fiber end fills the cylindrical void of the ferrule and is secured in place in the ferrule by an adhesive or other means. The sleeve has a void for accommodating and retaining ferrules, for example, two ferrules, in particular alignment. Because the ferrules accommodate the optic fiber ends, the optic fiber end faces are selectively alignable for optical connectivity by selectively positioning the ferrules with respect to each other. For example, two ferrules may be positioned within the sleeve, end to end, in order to position the optic fibers contained by the ferrules end face to end face in optical alignment and connection.

Ferrules containing optic fiber ends may be spring loaded to force the ferrules, and thus the optic fibers, to maintain desirable end face contact for a stable optical connection. In such contact, the fiber end faces elastically deform to make a desirable fiber optic to fiber optic connection. The fiber and ferrule end faces are precisely polished to control the fiber protrusion from the ferrule, for example, to control the protrusion to within tolerances of +/−50 nanometers.

Disadvantages of ferrule and sleeve connectors for optic fibers include the costs of the components, the precision required of the components, and the complex installation process. Relative to costs for copper connections, these disadvantages have made costs for fiber optic connections higher and, in many instances, use of fiber optics in lieu of copper wires economically unfeasible.

Conventional index matching gel is sometimes employed with fiber optic connectors. In connector designs employing the gel, the gel minimizes reflection in order to provide good optical connection. The use of index matching gel in fiber optic connections, however, has certain limitations. Furthermore, index matching gels are costly. Their use with conventional connection devices furthers the higher cost of conventional fiber optic connections relative to copper wires.

Other conventional fiber optic connections include devices formed with fiber-alignment grooves. An example of such devices is disclosed in U.S. patent application Ser. No. 08/664,039, filed on Jun. 13, 1996, titled "Optical Fiber Connector Using Fiber Spring Force and Alignment Groove". With such devices, optic fiber connections are made in the grooves, which are, for example, V-shaped grooves. Ends of optic fibers to be connected are placed into the groove, and each end progresses along the groove until the end face abuts an end face of another optic fiber end. Optic fibers in the grooves may be positioned for alignment, so that the end faces of the optic fibers are in contact, creating optical connections. The grooves may be formed, for example, by injection molding of common engineering thermoplastic materials using standard molding practices. Such molded components are typically less costly than the ferrule and sleeve components and provide other advantages.

In the molded connectors providing grooves for the fiber optic connection, precision for alignment of fiber core end faces is achieved by locating the fiber ends in the grooves with end faces of the fiber ends abutting. Additionally, force may be applied to each of the fiber ends, directed so that the abutting end faces are forced together. The force on the fiber ends may be achieved by bowing one of the fibers as it is pressed toward another fiber in the groove. The bow force on the fiber ends improves the end face to end face engagement and, thus, the optical characteristics of the connection. Bowing of the optic fiber in this manner also accounts for tolerances due to variation in molding or due to assembly and in-field installation of the connectors and, thereby, provides a range of acceptable positions along the groove for the fiber end face to end face engagement.

A disadvantage of bowing the optic fiber to achieve end face to end face engagement of optic fibers in a groove, for example, a V-shaped groove, is that the bowing results in only a low magnitude force at the end to end junction of the fibers. This is because the particular force is limited to the extent of the bending stress of the bowed optic fiber. It would be an advantage to provide connectors that increase the magnitude of the force applied at the end to end junction of optical fibers connected in the groove.

Therefore what is needed is systems and methods for increasing the force applied at the end face junction of optical fibers connected in connectors having grooves. Embodiments of the present invention provide the increased junction force and maintain the benefits of using standard molded components. The invention overcomes many of the disadvantages and problems of the foregoing conventional techniques and devices.

SUMMARY OF THE INVENTION

The embodiments of the present invention, accordingly, provide systems and methods for increasing the force exerted to engage optic fibers connected in a fiber-alignment groove, such as a V-shaped groove. The systems and methods provide advantages of increased force for the connection, better optical characteristics of the connection because of the increased force, and low cost relative to many of the conventional fiber optic connectors.

To this end, an embodiment of the invention is an optical fiber connector for optically connecting a first optical fiber and a second optical fiber. The optical fiber connector includes a plug suitable for retaining and selectively aligning the first optical fiber, a receptacle suitable for retaining and selectively aligning the second optical fiber, the plug being insertable in the receptacle for contacting the first optical fiber to the second optical fiber, and means for forcing the first optical fiber in contact with the second optical fiber.

Another embodiment of the invention is a connector for forcing an end of a first optical fiber towards an end of a second optical fiber in contact with the end of the first optical fiber. The connector includes means for bending the first optical fiber having the end of the first optical fiber in contact with the end of the second optical fiber and means for resisting positionally secured to the means for bending, bending of the first optical fiber being resisted by the means for resisting.

Yet another embodiment of the invention is a method of forcing an end of a first optical fiber to and in contact with an end of a second optical fiber to provide desirable optical characteristics. The method includes steps of bending the first optical fiber with the end of the first optical fiber in contact with the end of the second optical fiber and resisting the step of bending.

Another embodiment of the invention is an optical fiber connector for optically connecting an end of a first optical fiber to an end of a second optical fiber. The first optical fiber has a bend stress. The optical fiber connector includes means for aligning, the means for aligning retains the end of the first optical fiber and the end of the second optical fiber in contact, and means for forcing the end of the first optical fiber against the end of the second optical fiber, the means for forcing being connected to the means for aligning. The means for forcing causes the end of the first optical fiber to be forced against the end of the second optical fiber with a force in excess of that applied by the bend stress.

Yet another embodiment of the invention is a method for optically connecting an end of a first optical fiber to an end of a second optical fiber. The first optical fiber has a bend stress. The method includes steps of aligning the end of the first optical fiber and the end of the second optical fiber in contact and forcing the end of the first optical fiber against the end of the second optical fiber via a contact force in excess of a bend force created by the bend stress.

DETAILED DESCRIPTION OF THE PREFERRED EMBODIMENT

Figure 1:
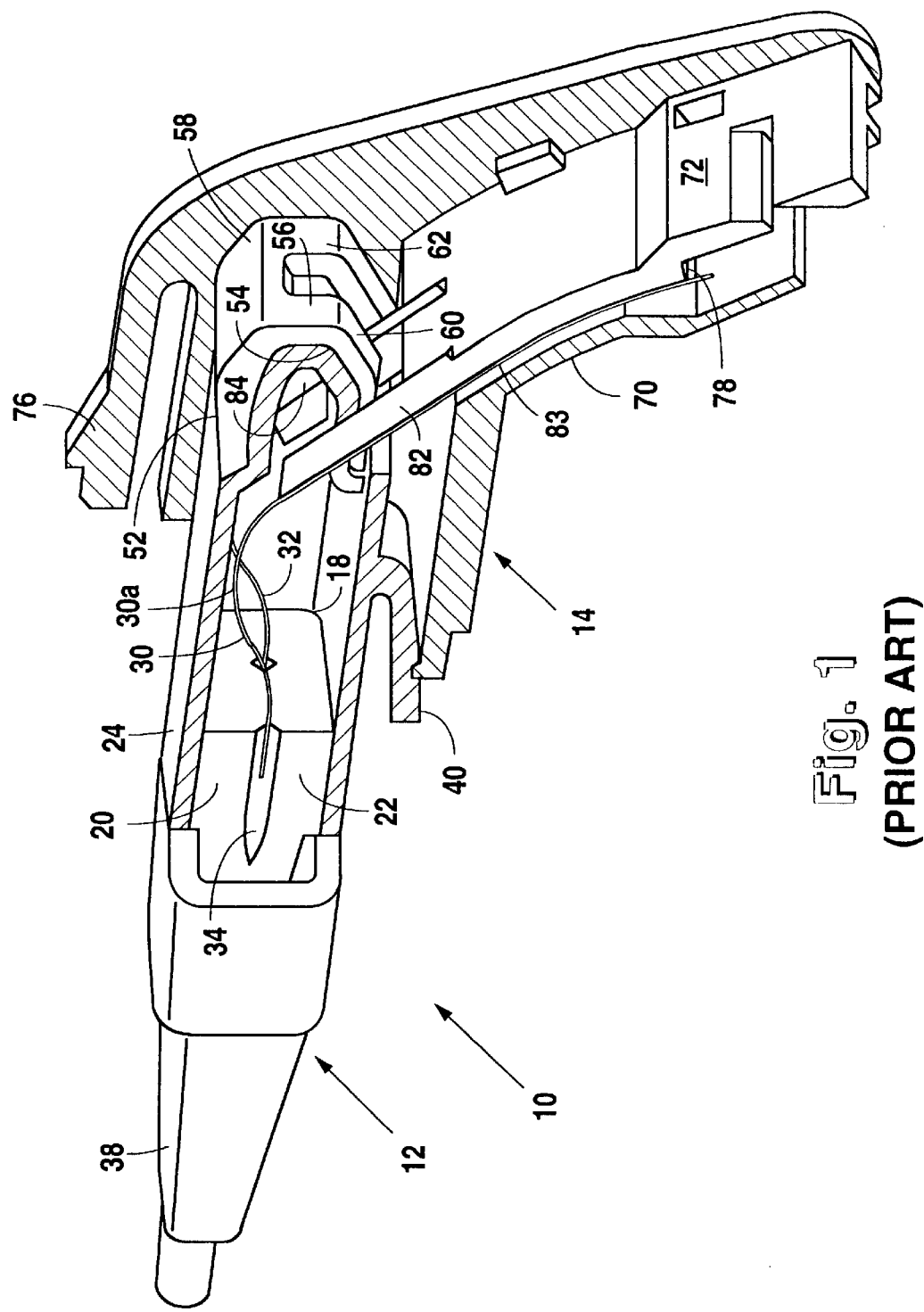
FIG. 1 is a perspective view of a conventional V-shaped fiber alignment groove fiber optic connector, including a plug and a receptacle, with a partial section revealing bowed fibers in the interior of the plug and the optic fiber junction in a V-shaped fiber alignment groove of the receptacle.

Referring to FIG. 1, a conventional fiber optic connector 10 includes a plug 12 and a receptacle 14. The plug 12 includes a fiber holder 18 formed of two blocks 20 and 22. The block 20 is located atop the block 22. The plug 12 also includes a shroud 24 attached to the fiber holder 18. The fiber holder 18 has fiber receiving grooves 34, for example, V-shaped fiber alignment grooves, formed in the adjacent surfaces of the blocks 20 and 22. The fiber holder 18 may have an extension (not shown). The extension may be housed in a boot 38 connected to the fiber holder 18. A latch 40 is integrally molded onto a side of the shroud 24. At a forward end 52 of the shroud 24, the shroud 52 is incorporated with a pair of slots 54 and 56. A door 58 is slidably attached to the forward end 52. The door 58 includes two bars 60 and 62.

The receptacle 14 of the fiber optic connector 10 accepts and retains the plug 12. The receptacle includes a housing 70. The housing 70 has an opening (not shown in detail) sufficient to accommodate the forward end 52 of the plug 12 when the plug 12 is inserted into the receptacle 14. A fiber holder 72 is pivotally connected to and located within the housing 70. The fiber holder 72 includes fingers 82 and 84 formed with fiber-alignment grooves, such as V-shaped fiber alignment grooves. The fingers 82 and 84 are shaped to project into the slots 54 and 56, respectively, of the shroud 24 when the plug 12 is fully inserted into the receptacle 14.

In operation, optical fibers 30 and 32 are placed in the fiber receiving grooves and pass through the holder 18 and into the hollow interior of the shroud 24. An optical fiber 78 is inserted into the fiber-alignment groove of the finger 82, and another optical fiber (not shown) is inserted into the fiber-alignment groove of the finger 84. The optical fiber 78 and the other optical fiber are positioned in the fiber-alignment grooves of the fingers 82 and 84, respectively, in such a manner that the optical fibers 30 and 32, when the plug 12 is inserted in the receptacle 14, extend into the fiber-alignment grooves of the fingers 82 and 84, respectively, and contact the optical fiber 78 and the other optical fiber, respectively, at junctions (only the junction 183 of the optical fibers 30 and 78 is shown). When the optical fiber 30 contacts the optical fiber 78 in the fiber-alignment groove of finger 82, excess length of the optical fiber 30 causes optical fiber 30 to bow 30a within the shroud 24. The optical fiber 32 also has a similar bow (not shown). As previously mentioned the bow 30a of the optical fiber 32 increases the force applied at the junction 183 of the optical fiber 32 and the optical fiber 78 because of the bending stress of the optical fiber 32. The force increases the contact engagement of the optical fibers 32 and 78 at the juncture 83, thereby increasing optical characteristics of the connection.

Further details of the fiber optic connector 10 and its operation are provided in the related U.S. patent application Ser. No. 08/664,039, incorporated herein in its entirety. Identifying numbers used herein correspond to the identifying numbers in the related application, and the description therein related to the identifying numbers and corresponding elements, applies herein.

Figure 2:
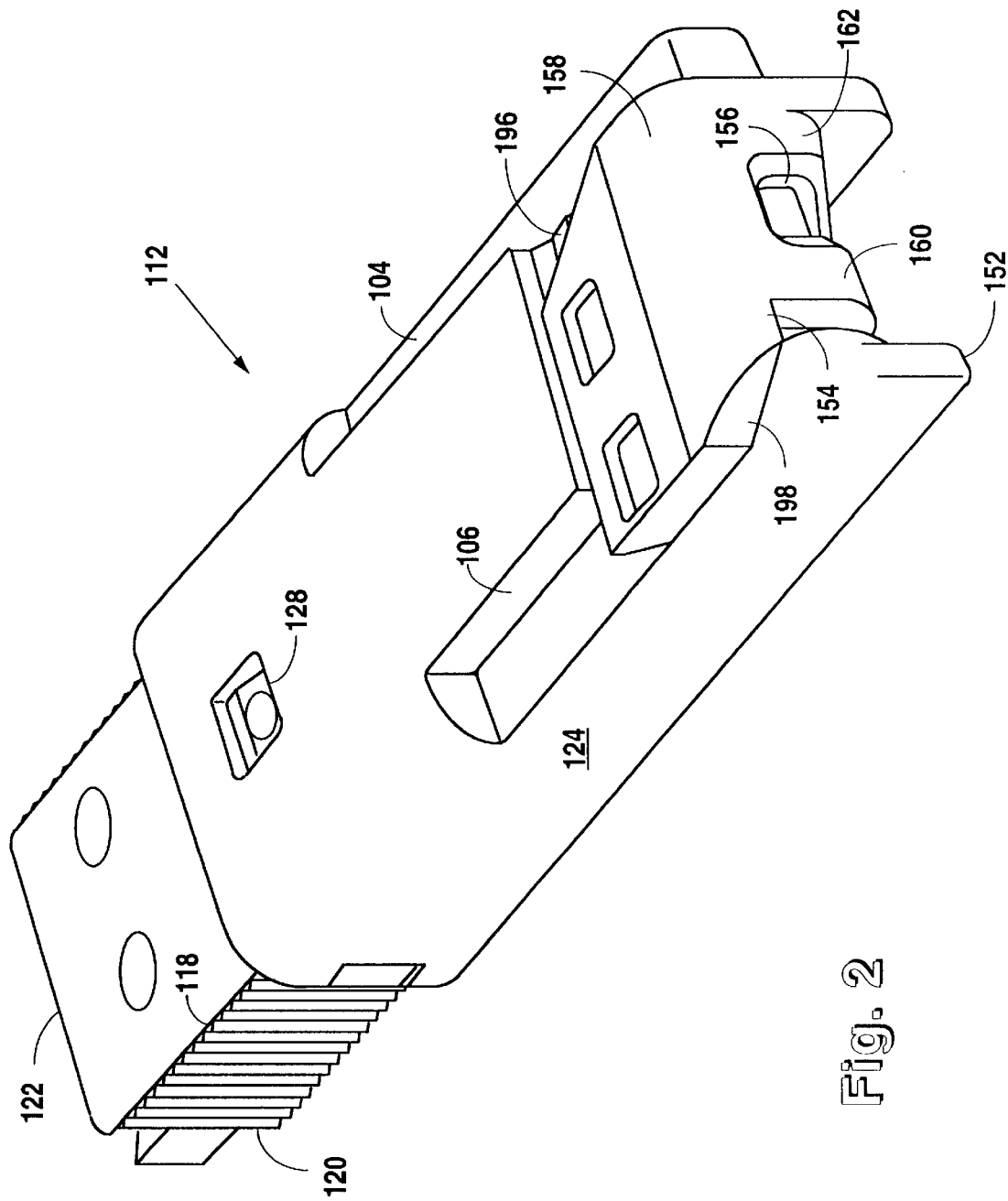
FIG. 2 is a perspective view of a fiber optic plug according to embodiments of the present invention.

Referring to FIG. 2, a plug 112, according to embodiments of the present invention, includes a shroud 124 and a fiber holder 118. A door 158 is slidably attached to the forward end 152 of the shroud 124. The door 158 is incorporated with slots 154 and 156. The door 158 includes two bars 160 and 162. The door 158 includes camming surfaces 196 and 198. Indentations 104 and 106 are incorporated in the shroud 124. The shroud 124 also includes a notch 128. The fiber holder 118 is formed of a lower block 120 and an upper block 122. The plug 112 is somewhat similar to the plug 12 (shown in FIG. 1) in function and operation, however, there are some significant differences which are more fully mentioned throughout this description.

Figure 3:
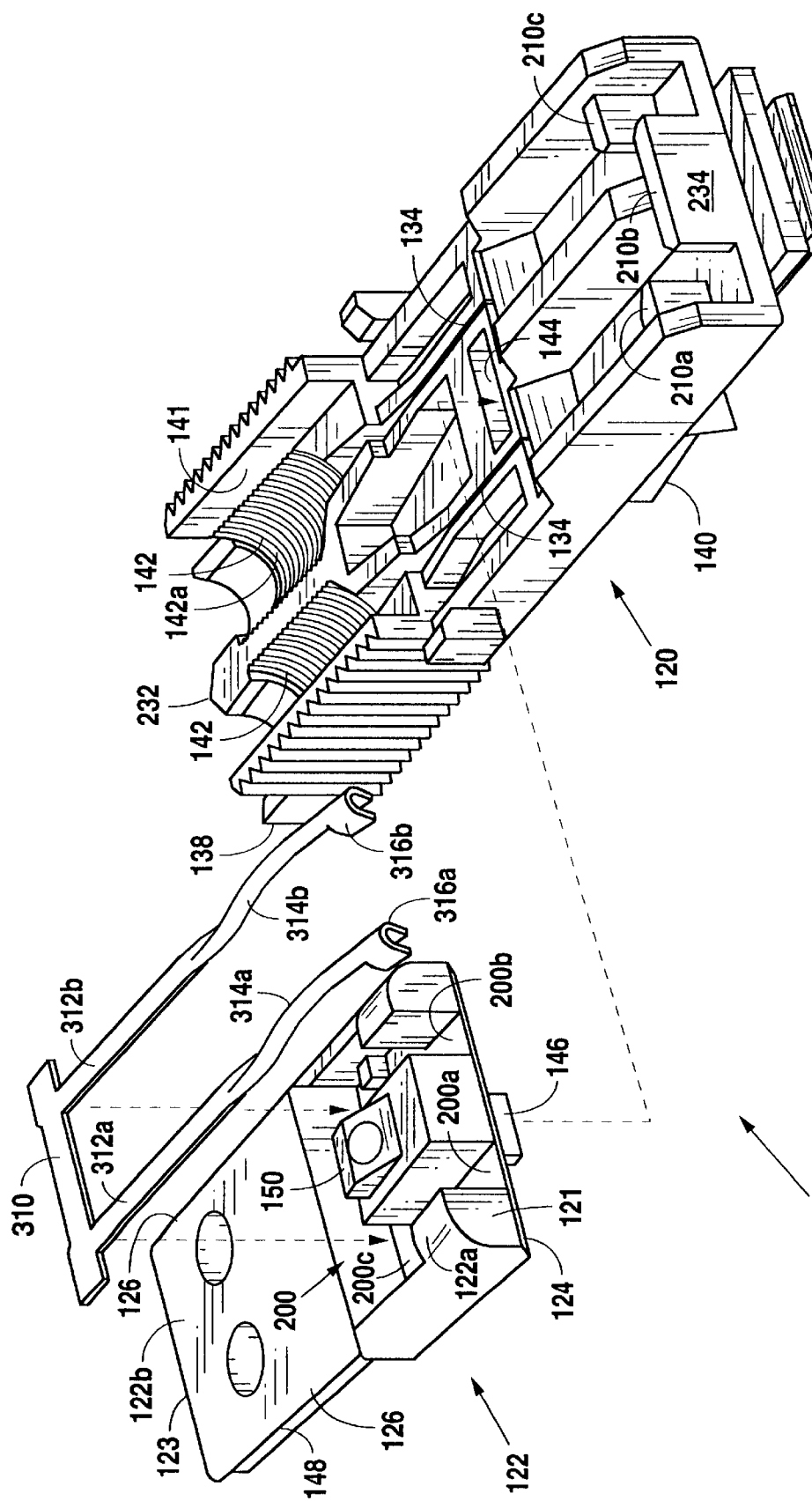
FIG. 3 is an exploded, perspective view of the plug of FIG. 2 with the plug shroud removed and showing a spring for exerting force on bows of optical fibers connected via the plug when employed with a plug receptacle, according to embodiments of the present invention.
Figure 4:
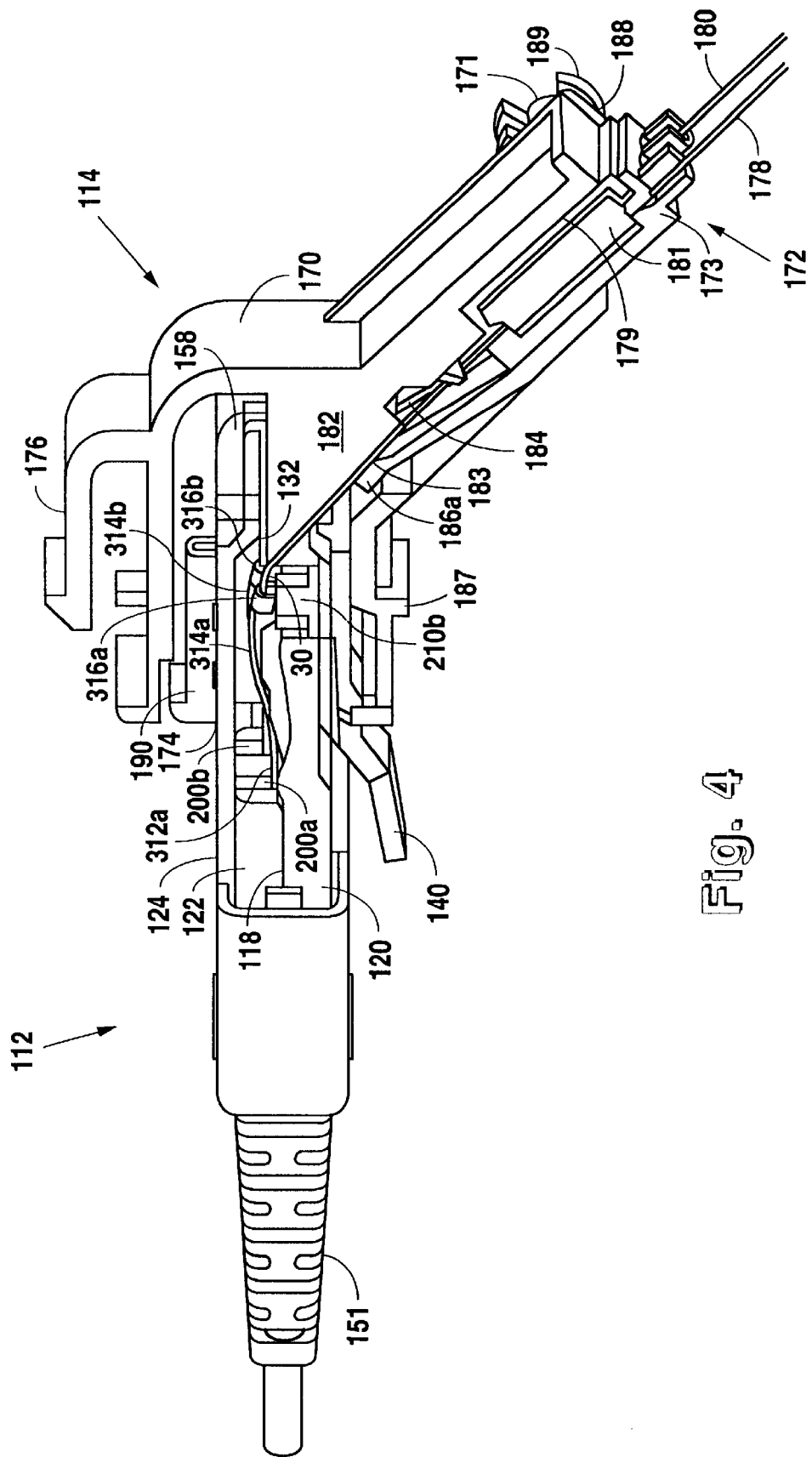
FIG. 4 is a side, partial cut-away view of a longitudinal section of the plug of FIG. 2 inserted in a plug receptacle to effect connection of bowed optical fibers with force exerted at the fiber to fiber junction by the spring, according to embodiments of the present invention.

Referring to FIG. 3, in conjunction with FIG. 4, the plug 112 with the shroud 124 removed reveals the fiber holder 118 of the plug 112. The fiber holder 118 includes the lower block 120, the upper block 122, and a spring 300. The lower block 120 is formed with fiber guide posts 210a, 210b, and 210c. The fiber holder 118 is also incorporated with fiber receiving grooves 134 for receiving and maintaining optical fibers 130 and 132 (shown in FIG. 4). The fiber guide posts 210a and 210c are configured to cause the optical fibers 130 and 132, respectively, to be directed laterally towards the fiber guide post 210b. The fiber guide post 210b is configured to cause the optical fibers 130 and 132 to be directed laterally towards the fiber guide posts 210a and 210c. The fiber guide posts 210a, 210b, and 210c serve to guide the fibers 130 and 132 within the shroud 124 into proper position for location in the fiber-alignment grooves of fingers 182 and 184 (shown in FIG. 4) of the receptacle 114 (shown in FIG. 4) when the plug 112 (shown in FIG. 2) is placed in the receptacle 114. Although one particular configuration of the fiber guide posts 210a, 210b, and 210c is shown in FIG. 3, alternative configurations are possible, as those skilled in the art will know and appreciate, that accomplish the same function of guiding the optical fibers 130 and 132 into respective fiber-alignment grooves of fingers of the receptacle 114, as later more fully described.

The lower block 120 of the fiber holder 118 is also equipped with a port 138 and a latch 140. The port 138 receives fiber optic lines (shown in FIG. 4). The latch 140 serves to desirably retain and release the fiber holder 118 from the receptacle 114. Ribs 141 atop each side of the lower block 120 towards the rearward portion 232 serve for receiving and retaining the upper block 122 in place atop the lower block 120. A post hole 144, located generally in a mid-portion of the lower block 120, serves to receive a post 146 of the upper block 122 in order to prevent the upper block 122 from shifting when located in place atop the lower block 120.

The lower block 120 also includes internal grooves 142 leading from the port 138. The internal grooves 142 have internal ridges 142a at a rearward portion 232 of the lower block 120. The internal grooves 142 are sufficient to accommodate conventional outer jackets of fiber optic lines (not shown) inserted in the internal grooves 142 and supplying the optic fibers 130 and 132, and the internal ridges 142a bind the outer jacket to retain the lines in the internal grooves 142. The internal grooves 142 may narrow as the internal grooves 142 progress from the rearward portion 232 towards a forward portion 234 of the lower block 122 and connect to the fiber receiving grooves 134. The narrowing of the internal grooves 142 serves to guide the optical fibers 130 and 132 of the fiber optic lines into the fiber receiving grooves 134.

The upper block 122 of the fiber holder 118 is attached atop the lower block 120. The upper block 122 is specially configured to provide certain advantages of embodiments of the present invention. In particular, the upper block 122 includes a thick portion 122a at a forward end 121 and a thin portion 122b at a rearward end 123 of the upper block 122. The upper block 122 includes a beveled edge 124 at a forward end 121 of the upper block 122. A spring depression 200 is formed in the thick portion 122a in the top of the upper block 122. The spring depression 200 extends substantially the width of the block 122 and includes to forward cutouts 200a and 200b extending from a central portion 200c of the spring depression 200 towards and through the forward end 121 of the upper block 122. The spring depression 200 has a depth of substantially the thickness of the thick portion 122a, but does not extend entirely therethrough. The dimensions of the spring depression 200 are adequate to accommodate a spring 300, as hereinafter more fully described. The upper block 122 has rounded edges 126 to aid positioning of the fiber holder 118 in the shroud 124 (shown in FIG. 2).

The upper block 122 also includes the post 146 extending from an underside of the upper block 122. The post hole 144 of the lower block 120 accommodates the post 146 and positions the upper block 122 with respect to the lower block 120 when the upper block 122 is placed in position atop the lower block 120. Lips 148 are located on each side of the upper block 122 along the underside of the thin portion 122b. The lips 148 serve to fit with the ribs 141 of the lower block 120 in order to secure the upper block 122 in place atop the lower block 120. A retention bump 150 is located atop the upper block 122 at the forward end 121. The retention bump 150 serves to retain the fiber holder 118 in the shroud 124 (shown in FIG. 2) through lodging of the retention bump 150 in the notch 128 (shown in FIG. 2) of the shroud 124.

The spring 300 includes a common portion 310 that is approximately the size of the central portion 200c of the spring depression 200 of the upper block 122. Extending from the common portion 310 are two extended fingers 312a and 312b. About mid-way along the extended fingers 312a and 312b, the extended fingers 312a and 312b are creased in half to form V-groove arched, upwardly bowed portions 314a and 314b, respectively. The bowed portions 314a and 314b maintain bows of the optical fibers 130 and 132. The extended fingers 312a and 312b terminate in bow retention crimps 316a and 316b, respectively. The common portion 310 of the spring 300 is locatable in the central portion 200c of the spring depression 200 of the upper block 122. The extended fingers 312a and 312b are of sufficient length that, when the common portion 310 is so located, the portions 314a and 314b and the bow retention crimps 316a and 316b are located in the vicinity of the bows of the optical fibers 130 and 132 (shown in FIG. 4). The bow retention crimps 316a and 316b are arched to form V-shaped grooves and have downward wings for containing the respective bows 130a and 132a of the optical fibers 130 and 132.

Figure 5:
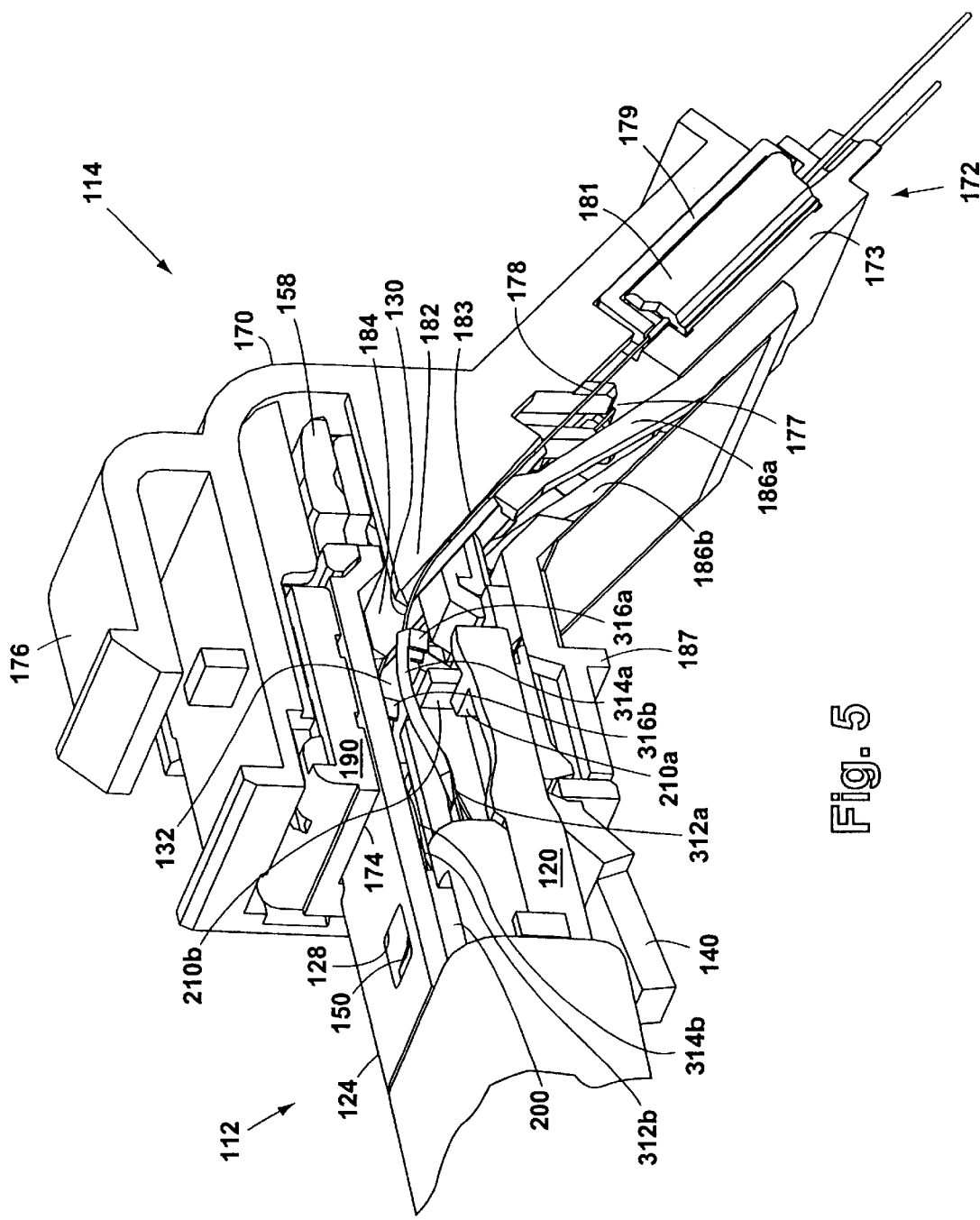
FIG. 5 is a partial, perspective, with partial cut-away, view of the longitudinal section of the plug and receptacle of FIG. 4, from a different angle than FIG. 4, according to embodiments of the present invention.

Referring to FIGS. 4 and 5, in conjunction, when the fiber holder 118 is placed in the shroud 124, the plug 112 is formed. The plug 112 mates with the receptacle 114. FIG. 4 shows a conventional boot 151 adjacent the plug 112 for, in conventional manner, preventing wear of the sheath of optical fiber lines which feed into the plug 112.

The receptacle 114 includes a housing 170, a fiber holder 172, and a bottom piece 187. The housing 170 has an opening 174 of size and shape corresponding to the forward end 152 of the plug 112. The housing 170 also has a latch arm 176 that allows the housing 170 to be releasably mounted to a bulkhead (not shown). This mounting is substantially as shown in the related application referenced above. Optical fibers 178 and 180 of the receptacle 114 are retained in the housing 170 by the fiber holder 172. The fiber holder 172 includes a base 173, clamping plates 181, and a cover 179. The fiber holder 172 is adapted to grip the optical fibers 178 and 180 at a first end of the receptacle 114. Terminal ends of the optical fibers 178 and 180 extend into fiber alignment grooves, for example, V-shaped, rounded, or other-shaped grooves, formed in fingers 182 and 184 of the housing 170. Fiber hold downs 186a and 186b (shown in FIG. 5) of the base piece 187 serve to retain the optical fibers 178 firmly in the fiber alignment grooves of the fingers 182 and 184, respectively. The optical fibers 178 and 180 do not extend to the very tips of the fingers 182 and 184, respectively, but terminate a sufficient distance from the tips to allow support of the optical fibers 130 and 132 when the plug 112 is in place in the receptacle 114. The junction 183 indicates an exemplary positioning of the termination of the optical fiber 178 where it contacts the optical fiber 130 in the fiber alignment groove of the finger 182. The optical fibers 180 and 132 have a junction in similar position in the fiber alignment groove of the finger 184.

The fingers 182 and 184 are shaped to project into the slots 154 and 156 (shown in FIG. 2), respectively, of the shroud 124 when the plug 112 is fully inserted into the receptacle 114. The fingers 182 and 184 enter the shroud 124 at an oblique (non-zero) angle with respect to the plug 112 axis, i.e., the axis defined by either of the plug fibers 130 or 132 when they are extending straight within the shroud 124. This angle is preferably about 42°, although other angles are also possible. The fiber holder 172 is pivotally attached to the housing 170 by posts 171 on the first end of the fiber holder 172. The posts 171 snap into hooks 188 formed at one end of the housing 170. The fiber holder 172, when engaged by the hooks 188 with the posts 171, pivots into place under the housing 170. When the fiber holder 172 is so pivoted and positioned under the housing 170, the optical fibers 178 and 180 are guided by fiber guides 177 into and along the fiber alignment grooves of the fingers 182 and 184, respectively.

The receptacle 114 has a receptacle door 190 to minimize entry of contaminants through the opening 174. The receptacle door 190 cooperates with the door 158 of the plug 112 to actuate the door 158 between closed and open states as the plug 112 is inserted into and removed from, respectively, the receptacle 114. Specifically, the receptacle door 190 has camming surfaces (not shown, but described and shown in the related application) which interact with the camming surfaces 196 and 198 of the door 158. The receptacle door 190 is hinged along one edge and the receptacle door is biased, each as described in the related application. When the plug 112 is inserted into the receptacle 114, the forward end 152 and door 158 of the plug 112 push against the receptacle door 190, raising and opening it. One of the camming surfaces of the receptacle door 190 then begins to forcibly abut the camming surface 198 of the door 158 of the plug 112, pushing the door 158 to the side to reveal the slots 154 and 156. If the plug 112 is thereafter removed from the receptacle 114, the other of the camming surfaces of the receptacle door 190 similarly pushes against the camming surface 196 of the plug 112 as the plug 112 is removed, thereby sliding the door 158 back into its closed position. The shroud 124 has the indentations 104 and 106 to accommodate the camming surfaces of the receptacle door 190 when the plug 112 is in the receptacle 114. Reference to the related application also details the door 158 and receptacle door 190 features and operation, as well as certain alternatives.

When the plug 112 is fully inserted into the receptacle 114, the spring 300 forces the bows 130*a* and 132*a* of the optical fibers 130 and 132 downward in the FIG. to increase the force exerted at the junction 183 of the optical fiber 130 and the optical fiber 178 and the junction (not shown) of the optical fiber 132 and the optical fiber 180 when the plug 112 is fully inserted into the receptacle 114. The common portion 310 of the spring 300 is located in the spring depression 200 of the upper block 122. The extended fingers 312*a* and 312*b* of the spring 300 extend from the common portion 310 towards the receptacle 114. The bows 130*a* and 132*a* of the optical fibers 130 and 132, respectively, reside in the respective V-shaped (or other-shaped) arches of the portions 314*a* and 314*b*, respectively, and the bow retention crimps 316*a* and 316*b*, respectively, at the end of the extended fingers 312*a* and 312*b*, respectively.

The spring 300 is formed of a material that is elastic enough to bend upwardly (in the FIG.) when the bows 130*a* and 132*a* are forced against the V-shaped grooves of the portions 314*a* and 314*b*, respectively, and the bow retention crimps 316*a* and 316*b*, respectively, but that is sufficiently rigid that the fingers 312*a* and 312*b* maintain a downward (in the FIG.) force against the bows 130*a* and 132*a*, respectively, to cause the optical fibers 130 and 132 to exert desirable force at the junction 183 with the optical fiber 178 and the junction (not shown) with the optical fiber 180. A suitable material for the spring 300 is a metal, such as a thin stainless steel sheet, or other material that is sufficiently rigid, yet flexible to provide desired force against the bows 130*a* and 132*a*, for example, about 5 grams of force or greater.

Figure 6:
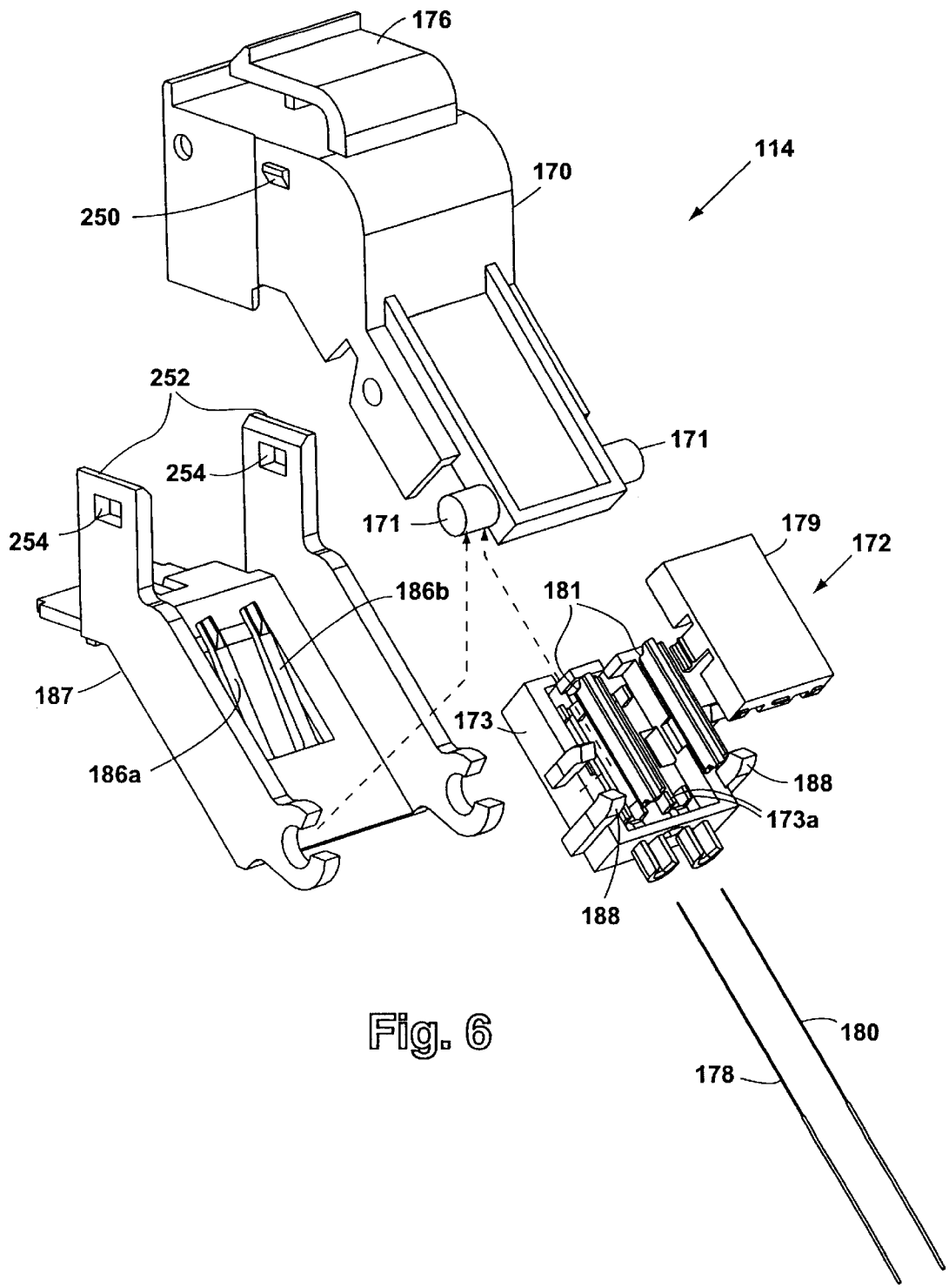
FIG. 6 is an exploded, perspective view of a housing, fiber holder, and bottom piece of the receptacle of FIGS. 4 and 5.

Referring to FIG. 6, the connection of the housing 170, the fiber holder 172, and the bottom piece 187 forms the receptacle 114. The fiber holder 172 includes the base 173, the clamping plates 181, and the cover 179. The base 173 is formed with the hooks 188 and with passageways through opposing walls for passage of the optical fibers 178 and 180 therethrough. Internally to the base 173 are several projections 173*a* extending from the base 173. The projections 173*a* are selectively spaced to accommodate the clamping plates 181. The clamping plates 181 are each formed of a malleable material, for example, a malleable aluminum metal, in a somewhat U-shape. The clamping plates 181 each hold respective ones of the optical fibers 178 and 180 within the U-shape. Because the clamping plates 181 are malleable, they may be crimped to engage the respective ones of the optical fibers 178 and 180. When so crimped, the clamping plates 181, when located between respective sets of the projections 173*a*, retain the optical fibers 178 and 180 with the base 173. The cover 179 includes inserts which fit notches of the base 173 to retain the cover 179 on the base 173 when the inserts and notches are engaged. In certain embodiments, pressing of the cover 179 onto the base 173 to engage the inserts and notches may serve to cause the crimping of the clamping plates 181 necessary to retain the optical fibers 178 and 180.

The fiber holder 172, with the base 173, the clamping plates 181 with the optical fibers 178 and 180 therein, and the cover 179 connected together as described, attaches to the posts 171 of the housing 170 via the hooks 188. The hooks 188 snap onto the posts 171, and the fiber holder 172 pivots into place against the underside of the housing 170.

With the fiber holder 172 in place in that manner, outer hooks 189 of the bottom piece 187 snap onto the posts 171 external to the hooks 188. The bottom piece 187, as so engaged by the outer hooks 189 with the posts 171, pivots into place against the housing 170. The bottom piece 187 has upward extensions 252. These upward extensions have holes 254. The housing 170 includes notches 250. The holes 254 mate with the notches 250 when the bottom piece 187 is pressed to the housing 170, for example, by hand force. When the holes 254 and the notches 250 are so mated, the housing 170, the fiber holder 172, and the bottom piece 187 remain engaged, forming the receptacle 114.

In operation, the receptacle 114 of the connector is mounted on the bulkhead. The optical fibers 178 and 180 are retained by the fiber holder 172 of the receptacle 114 in the fiber-alignment grooves of the fingers 182 and 184, respectively. The optical fibers 130 and 132 are retained by the fiber holder 118 of the plug 112 and are guided by the fiber guide posts 210a, 210b, and 210c in the hollow interior of the shroud 124. When the plug 112 is begun to be inserted into the opening of the housing 170 of the receptacle 114, the door 158 slides to allow the fingers 182 and 184 to enter the slots 154 and 156, respectively. As the fingers 182 and 184 enter the slots 154 and 156, respectively, the optical fibers 130 and 132, respectively, engage and slide along the respective fiber-alignment grooves of the fingers 182 and 184, respectively, towards the junction 183 and the other junction.

Once the optical fibers 130 and 132 contact the optical fibers 178 and 180, respectively, of the receptacle 114, ends of the optical fibers 130 and 178 contact and ends of the optical fibers 132 and 180 contact. As the plug 112 is pushed further into the receptacle 114, force increases at the contact points of the optical fibers 130 and 178 and the optical fibers 132 and 180 (i.e., at the junction 183 and the other junction). As the force increases, the stress bends the optical fibers 130 and 132 and causes the bows 130a and 132a, respectively. As the bows 130a and 132a grow larger as the plug 112 is further inserted into the receptacle 114 to the fully inserted position, the bows 130a and 132a contact the portions 314a and 314b, respectively, and the bow retention crimps 316a and 316b, respectively, and reside in the V-shaped arched grooves thereof. The bending of the optical fibers 130 and 132 is countered by the resiliency of the spring 300. This directs the bending forces of the optical fibers 130 and 132 towards the optical fibers 178 and 180, respectively, at the junction 183 and the other junction, respectively. The increased force at the junction 183 and the other junction improves the contact of the optical fibers 130 and 132 of the plug 112 with the optical fibers 178 and 180, respectively, of the receptacle, increasing the optical stability and characteristics of the connection.

Variations of the foregoing are possible. For example, the particular force at the junctions of the optical fibers may be varied by the choice of the material of the spring. If greater force is desired, a more rigid spring is necessary, and vice versa. Furthermore, the spring configuration may be varied to be assembled to the plug and locked into place mechanically, by ultrasonics, or by staking. The spring could also be manufactured and assembled to the plug so as to apply a pre-load to the spring if desired. Another possibility is that the spring is molded as part of the fiber holder or otherwise as part of the plug. Although the spring of the particular foregoing embodiments extends from the fiber holder, the spring could alternatively or additionally extend from the shroud, the receptacle, or some other component. The spring could alternatively or additionally comprise a foam or other similarly resilient piece attached internally to the roof of the shroud of the plug. Also alternatively or additionally, the spring may be tubes or coatings encasing the optical fibers from the plug, which tubes or coatings increase the rigidity of the optical fibers themselves in the vicinity of the illustrated bows of the optical fibers. Furthermore, the fiber connection groove may be any optical fiber guiding element, for example, a ferrule with an inner longitudinal cylindrical void or others.

It is also possible that other types of connections of optical fibers can be made employing similar spring principles, such as plug-receptacle-plug connections. In that instance, the receptacle would merely provide inserts for both plugs and common grooves or other guiding elements (such as ferrules) for accepting and guiding optical fibers from the respective plugs and causing those optical fibers to contact at end faces thereof. In such an instance, the optical fibers of one or both plugs may be bowed in providing desired end face contacts. Springs are employable according to the same principles described herein for all the bowed fibers. In other alternatives, the connector, including plug(s) and receptacle (s) may be adapted to connect end-faces of optical fibers that are hard polymer coated fibers, either multi-mode or single mode, glass fibers, plastic fibers, or other fibers. In the case of glass fibers, coating on the fibers extending from the plug are preferably retained on the fibers throughout the portion of the bow of the fibers in contact with the spring. This contributes to prevention of damage to the standard glass fibers from contact with the spring. Of course, numerous changes are possible to the optical fiber guides in the plug. Plugs and receptacles can be designed to accommodate fewer or more optical fiber connections. The mechanisms for latching the plug with the receptacle could also be varied in many ways.

Although illustrative embodiments of the invention have been shown and described, a wide range of modification, change, and substitution is contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. A connector for connecting first and second optical fibers, comprising:
   a first element adapted to maintain an end of the first fiber in a fixed position;
   a second element, interconnectable with said first element, adapted to maintain an end of the second fiber in a fixed, abutting relationship with the end of the first fiber while creating a bend in the second fiber adjacent to the end of the second fiber; and
   a lever, disposed within said second element and extending over the bend in the second fiber, adapted to exert a pressure in opposition to the direction of the bend when said first element is connected with said second element.

2. The connector of claim 1, wherein said lever extends longitudinally over the bend in the second fiber.

3. The connector of claim 2, wherein said lever terminates in a clasp which is in contact with the second fiber in the vicinity of the bend therein.

4. The connector of claim 3, wherein said clasp is essentially complimentary to the shape of the surface of the fiber.

5. The connector of claim 1, wherein said lever is resilient.

6. The connector of claim 1, wherein said second element is provided with an open channel through which the second fiber extends, and wherein said lever extends over said channel.

7. A connector for connecting first and second optical fibers, comprising:
   a first element adapted to maintain an end of the first fiber in a fixed position;
   a second element adapted to maintain an end of the second fiber in a fixed, abutting relationship with the end of the first fiber while creating a bend in the second fiber adjacent to the abutting end of the second fiber; and
   a resilient arm, disposed within said second element and extending over the bend in the second fiber, said arm being adapted to exert a pressure in opposition to the direction of the bend.

8. In combination with first and second optical fibers, a connector for connecting the ends of said first and second fibers, said connector comprising:

a first holding means for holding an end of the first fiber in a fixed position;

a second holding means for holding an end of the second fiber in a fixed, abutting relationship with the end of the first fiber while creating a bend in the second fiber adjacent to the abutting end of the second fiber;

a sleeve, extending over at least a portion of said bend, said sleeve being attached to a longitudinal arm, said arm being adapted to exert a pressure in opposition to the direction of said bend.

9. A connector for connecting first and second optical fibers, comprising:

a first element adapted to maintain the ends of a first set of fibers in a fixed position;

a second element, interconnectable with the first element, said second element being adapted to maintain the ends of a second set of fibers in a fixed orientation with respect to the ends of the first set of fibers such that the end of each fiber in the first set is in an abutting relationship with the end of exactly one fiber in the second set and such that a bend is created in each fiber of the second set adjacent to the abutting end of the fiber; and a third element comprising a plurality of arms extending from a common base, each of said arms extending longitudinally over one of the bends in the second set of fibers and being adapted to exert a pressure in opposition to the direction of the bend.

10. The connector of claim 9, wherein each of said arms is resilient.

11. The connector of claim 9, wherein each of said arms terminates in a clasp which extends over one of the fibers of the second set in the vicinity of the bend in the fiber.

12. The connector of claim 9, wherein said second element is provided with a plurality of open channels through which the fibers of the second set extend, and wherein each of said arms extends over one of said plurality of channels.

13. In combination with a first and second set of fibers, a connector for connecting an end of each fiber in the first set to an end of exactly one fiber in the second set, said connector comprising:

a first holding means for holding the ends of the fibers in the first set in a fixed position;

a second holding means for holding the ends of the fibers in the second set in a fixed orientation with respect to the ends of the fibers of the first set such that the end of each fiber in the first set is in an abutting relationship with the end of exactly one fiber in the second set and such that a bend is created in each fiber of the second set adjacent to the abutting end of the fiber; and compressing means for compressing the bends in the fibers of the second set, said compressing means comprising a plurality of resilient arms extending from a common base.

* * * * *